United States Patent [19]

Stronczek et al.

[11] Patent Number: 5,637,927
[45] Date of Patent: Jun. 10, 1997

[54] DEVICE FOR SWITCHING CONTROL OF VEHICLE ACCESSORIES BETWEEN VEHICLE CONTROL STATIONS

[75] Inventors: Steven J. Stronczek; Richard J. Frigon, both of Michigan City, Ind.

[73] Assignee: Sprague Devices, Inc., Michigan City, Ind.

[21] Appl. No.: 628,272

[22] Filed: Apr. 5, 1996

[51] Int. Cl.⁶ .................................................. H04Q 1/00
[52] U.S. Cl. ............................. 307/10.1; 15/250.001; 180/321; 307/141.4
[58] Field of Search .................................. 307/9.1, 10.1, 307/141, 141.4, 70, 80, 81, 85, 86, 87; 318/DIG. 2; 180/315, 321–324; 15/250.001, 250.12, 250.13

[56] References Cited

U.S. PATENT DOCUMENTS

| | | |
|---|---|---|
| 4,361,200 | 11/1982 | Igarashi ............................. 180/321 |
| 4,716,980 | 1/1988 | Butler ................................. 180/321 |
| 5,237,207 | 8/1993 | Kwiatkowski et al. ........... 307/141 |
| 5,280,282 | 1/1994 | Nagafusa et al. .................. 180/321 |

*Primary Examiner*—Richard T. Elms
*Attorney, Agent, or Firm*—Baker & Daniels

[57] ABSTRACT

A control device for switching control of vehicular accessories between separate vehicle control stations. The device has an output connector connected to the vehicle's accessories, input controls including a control switch located at each control station, and a gating means connected between the input controls and the output connector. When one of the control switches is activated, the gating means connects the control inputs of the corresponding control station to the output connector and disconnects all other control stations. When a control switch is continuously activated for a predetermined duration of time, control is transferred to the corresponding control station and a discrete vehicle accessory driven by the control switch is activated.

10 Claims, 2 Drawing Sheets

DEVICE FOR SWITCHING CONTROL OF VEHICLE ACCESSORIES BETWEEN VEHICLE CONTROL STATIONS

FIELD OF THE INVENTION

The present invention relates to a device for switching control of vehicle accessories between separate vehicle control stations.

DESCRIPTION OF THE RELATED ART

In various vehicles, such as mining vehicles, refuse trucks, and railroad engines, the vehicle operator needs to be able to control the vehicle from more than one location within the vehicle. Thus, some refuse trucks, for example, are equipped with both driver and passenger side control stations. The passenger side control station permits the operator to control the vehicle from the passenger side during refuse collection, eliminating the inconvenience of walking to around the vehicle to the driver's side control station at each stop. Since the operator must also have control over certain vehicle functions and accessories while controlling the vehicle, each station must permit the operator to assume control over the vehicle's functions and accessories.

In such vehicles, some accessories can be adapted to receive redundant inputs and thus, all control stations can be simultaneously enabled and capable of exerting control. Other accessories require control inputs to alternate between control stations such that when one station is enabled, all others are disabled to avoid conflicting control inputs from the control stations. For example, a single air motor drives the pneumatically actuated windshield wipers used on some refuse trucks. Thus, the separate air controls from each control station must be fed into a multi-position air actuated valve connected to the air motor which alternates control between the stations. Such a configuration can have undesirable consequences. For example, the operator may forget to turn off the air control from one control station before moving to another station. If the operator tries to operate the other air control, the controls conflict and, under some circumstances, fail to control the wipers. To correct the situation, the operator must return to the first station, disable the first air control, then return to the second station and enable the second air control. Otherwise, the operator must proceed with the first control in its current setting and accept the potential safety hazards of not being able to adjust the wiper setting according to changing conditions. Thus, to avoid the inconvenience and safety hazards of forfeiting control over the wiper system, the operator must always remember to turn off one control before relocating to another station.

SUMMARY OF THE INVENTION

The present invention provides a control device for switching control of vehicle accessories between one control station and another without requiring the operator to disable the controls of one station before moving to another station. The invention comprises, in one form thereof, an output connector connected to the vehicle's accessories, input controls including a control switch located at each control station, and a gating means connected between the input controls and the output connector which responds to activation of a station's control switch by connecting the station's input controls to the output connector, thereby switching control of the vehicle accessories to that control station. Additionally, the control switch outputs are routed to a delay means which activates one of the vehicle's accessories in response to sustained activation of a control switch for a predetermined period of time.

Accordingly, a purpose of the present invention is to provide a device for switching control of vehicle accessories from one control station to another.

Another purpose is to provide a device which permits the operator to switch control of vehicle accessories to a particular control station without having to first disable the other control stations.

Yet another purpose is to provide a device for switching control of vehicle accessories between control stations using one of the accessory control switches as a control station selection switch.

Other purposes of this invention will become apparent upon a reading of the following description.

BRIEF DESCRIPTION OF THE DRAWINGS

The above-mentioned and other purposes and advantages of this invention, and the manner of attaining them, will become more apparent and the invention will be better understood by reference to the following description of an embodiment of the invention taken in conjunction with the accompanying drawings, wherein.

DESCRIPTION OF THE PREFERRED EMBODIMENT

Figure 1:
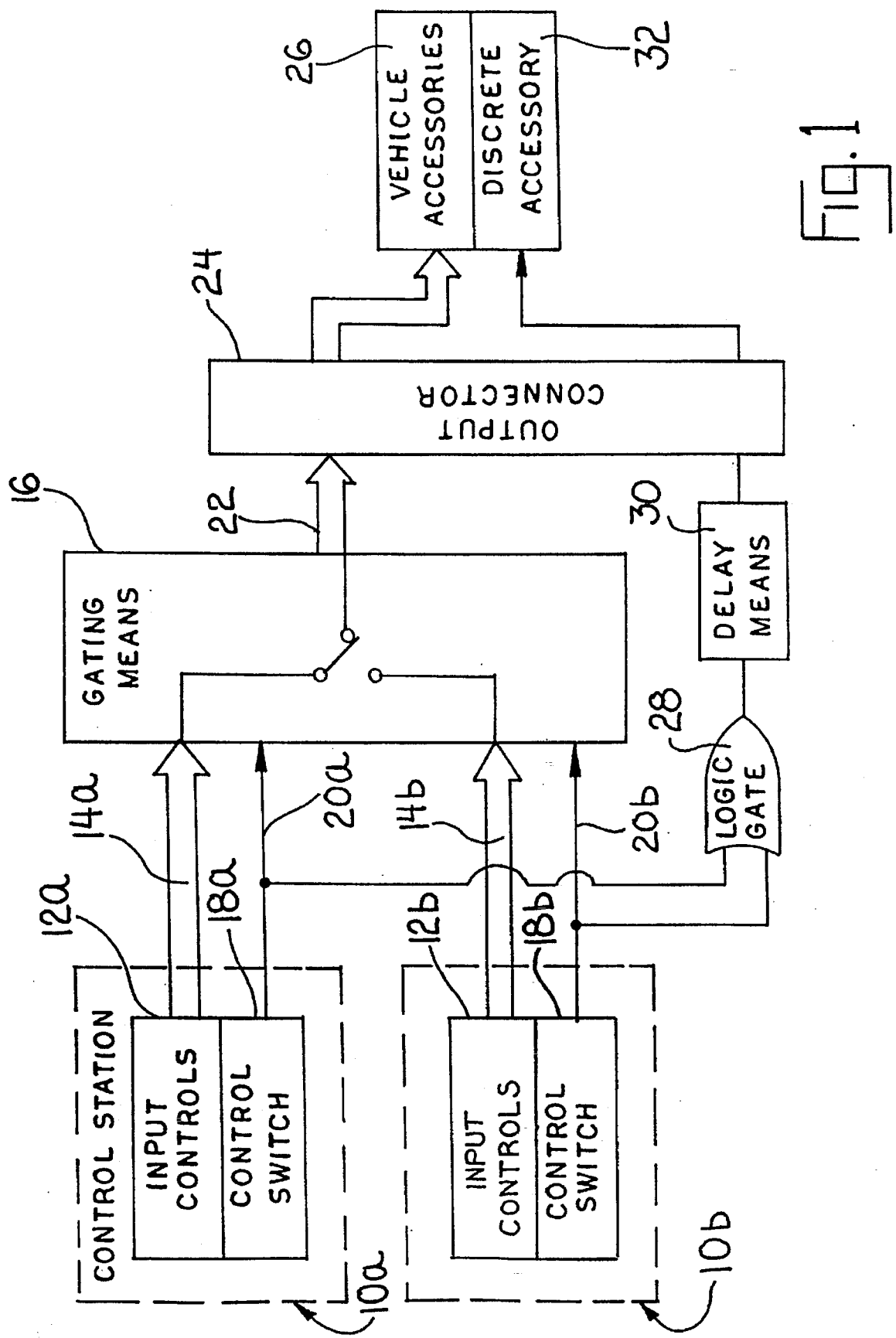
FIG. 1 is a block diagram of the control device of the present invention.

Corresponding reference characters indicate corresponding parts throughout the several figures. The description set out herein illustrates one preferred embodiment of the invention, but does not limit the scope of the invention in any manner.

Referring now to the drawings and particularly to FIG. 1, there is shown two control stations 10a,10b, each having input controls 12a,12b which produce control signals transmitted over the busses 14a,14b to gating means 16, the operation of which is explained in detail below. Each set of input controls 12a, 12b includes a control switch 18a,18b which is also connected to gating means 16. Control switches 18a,18b generate gating signals on lines 20a,20b which control the operation of gating means 16. Gating means 16 has output bus 22 which is connected though output connector 24 to the vehicle accessories 26. Control switches 18a,18b are also connected to logic gate 28, which is routed to delay means 30. The delay means 30 is connected through output connector 24 to discrete vehicle accessory 32.

Figure 2:
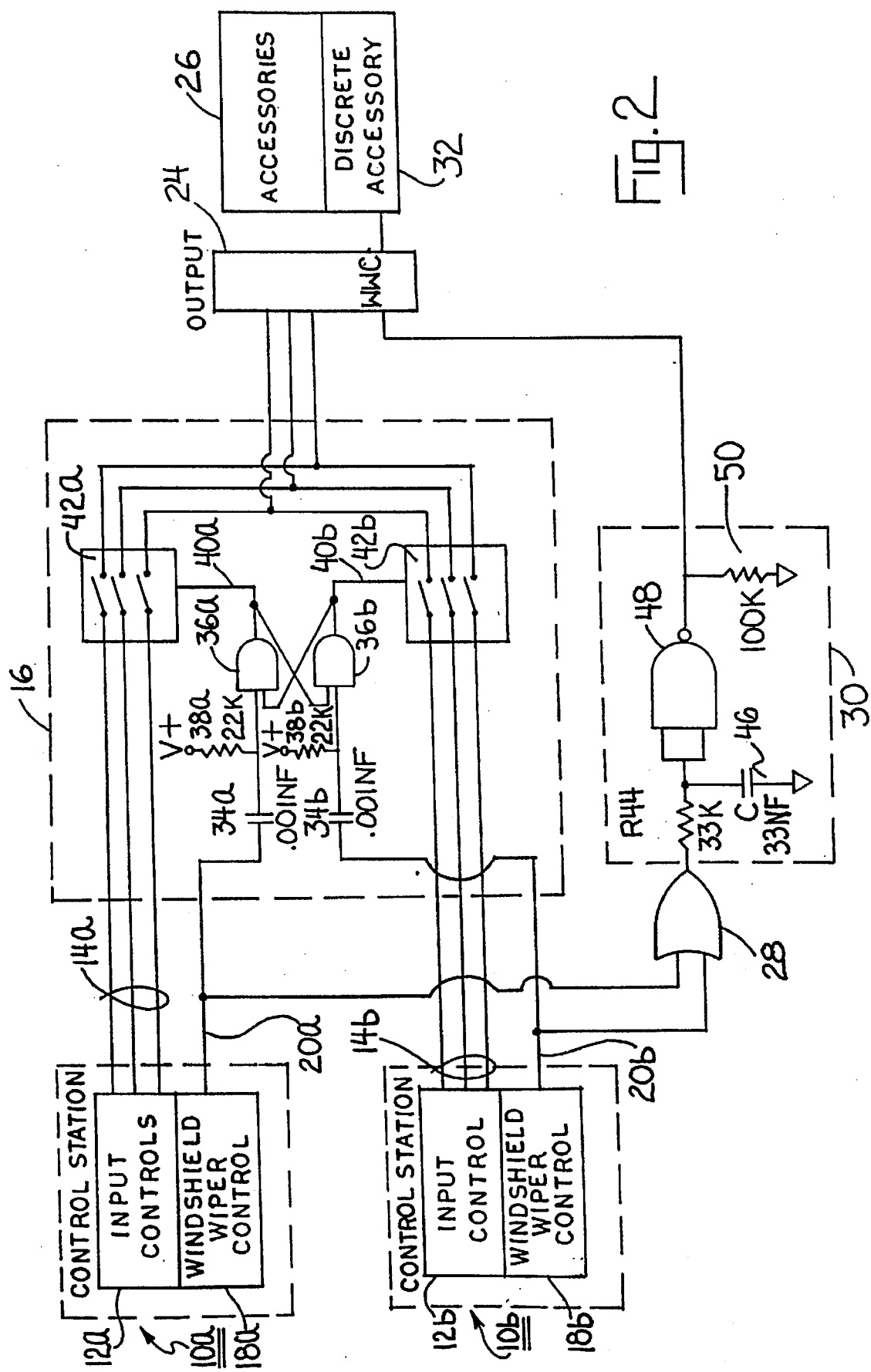
FIG. 2 is a block diagram of the control device of the present invention as applied to a windshield wiper system.

As shown in FIG. 2, gating means 16 includes commutation capacitors 34a,34b. Gating signals on lines 20a,20b are routed to the input side of capacitors 34a,34b respectively. The output of capacitor 34a is connected to an input of gate 36a and pulled up to V+ by resistor 38a. The remaining input to gate 36a is connected to the output of gate 36b. The output of gate 36a produces an enabling signal on line 40a which is routed to switch bank 42a. The inputs to switch bank 42a, which contains a plurality of individual switches, are connected to input controls 12a. Each output of switch bank 42a is tied to a corresponding output of switch bank 42b and routed over output bus 22, to output connector 24. The output of capacitor 34b is connected to an input of gate 36b and pulled up to V+ by resistor 38b. The remaining input to gate 36b is connected to the output of gate 36a, completing the commonly known flip-flop configuration of gates 36a, 36b. The output of gate 36b produces an enabling signal on line 40b which is routed to switch bank 42b. The inputs to switch bank 42b, which also contains a plurality of individual switches, are connected to input controls 12b. The outputs of switch bank 42b are tied to switch bank 42a and routed to output connector 24 as described above.

Delay means 30 consists of in-line resistor 44, capacitor 46, driver 48 (configured as an inverter), and pull-down resistor 50. Resistor 44 is connected between the output of logic gate 28 and the inputs of driver 48. Capacitor 46 is connected between ground and the junction between resistor 44 and driver 48. Pull-down resistor 50 is connected between the output of driver 48 and ground. Driver 48 provides the output of delay means 30 to output connector 24 which is connected to discrete accessory 32.

MODE OF OPERATION

The operator may assume control over vehicle accessories 26, including the windshield wiper system from either of the control stations 10a or 10b by actuating the corresponding control switch 18a or 18b which also operates the wiper system wash function as will be further explained below. For example, if the operator is to control the accessories from station 10a, control switch 18a is momentarily operated to produce a gating signal on line 20a which passes through capacitor 34a and gate 36a, producing an enabling signal on line 40a at the output of gate 36a. This enabling signal simultaneously closes each of the switches included in switch bank 42a, connecting input controls 12a through switch bank 42a and output connector 24 to vehicle accessories 26. The enabling signal at the output of gate 36a is also connected to an input of gate 36b. Accordingly, the enabling signal at the output of gate 36b is deactivated, disabling switch bank 42b. Thus, when the enabling signal on line 40a is present, the plurality of switches included in switch bank 42b are simultaneously opened, ensuring that input controls 12b are not connected to output connector 24. Accordingly, the outputs of switch banks 42a and 42b, which are connected together, cannot be simultaneously active.

Similarly, if the operator is to control the vehicle accessories from the other control station 10b, control switch 18b is momentarily operated to produce a gating signal on line 20b to enable switch bank 42b while simultaneously disabling switch bank 42a. As a result, control inputs 12b are each routed through the corresponding switches within switch bank 42b, through output connector 24, to vehicle accessories 26.

Control switches 18a, 18b perform the additional function of activating discrete accessory 32, shown in FIG. 2 as the wash function of the windshield wiper system. When actuated, control switch 18a causes the near instantaneous transfer of control to control station 10a as described above. However, logic gate 28, which is a standard OR gate, does not instantaneously activate discrete accessory 32, even though it produces an output to delay means 30 in response to the gating signal on line 20a. Instead, delay means 30 remains deactivated unless logic gate 28 provides a continuous output for a predetermined duration of time. This delay is accomplished with a commonly known delay network consisting of resistor 44 and capacitor 46 at the input to a driver gate 48 as shown in FIG. 2.

If the operator continuously actuates control switch 18a, for example, logic gate 28 provides a continuous output to delay means 30 in response to the gating signal on line 20a. The output of logic gate 28 eventually charges capacitor 46 above the threshold input voltage level of driver gate 48, causing driver gate 48 to provide a signal to discrete accessory 32 through output connector 24. A similar sequence of events occurs when the operator actuates control switch 18b of control station 10b and sustains the actuation beyond the predetermined duration of time. The predetermined duration of time is fixed by the resistance and capacitance values of resistor 44 and capacitor 46 according to principles commonly known in the art.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. In a vehicle having multiple control stations for controlling electrically controlled vehicle accessories, a control device for switching control of said accessories between said stations comprising:

an output connector connected to said accessories;

a plurality of input controls located at each of said stations for controlling said accessories, each of said plurality of input controls including a control switch means for generating a gating signal when the control switch means is actuated for a first predetermined time period and for actuating its corresponding accessory when the control switch means is actuated for a second predetermined time period; and gating means switchable from a first condition connecting one of said stations to said output connector to a second condition connecting another of said stations to said output connector, said gating means being responsive to the gating signal generated by one of said control switch means for switching from said first condition to said second condition and being responsive to the other control switch means for switching from said second condition to said first condition.

2. Control device of claim 1 wherein said gating means includes delay means connected between said control switch means and said output connector for receiving said gating signal, said delay means delaying, for said second predetermined time period transmission of a signal actuating said corresponding accessory.

3. Control device of claim 2 wherein said gating means includes at least two switch banks, each of said switch banks having switches connected between said output connector and one of said input controls, said switch banks closing in response to a gating signal generated by a corresponding control switch means.

4. Control device of claim 3 wherein said switch banks are controlled by an enabling means connected between said switch banks and said control switch means of said input controls for closing said switches of one switch bank in response to said gating signal generated by said one control switch means and alternatively closing said switches of the other switch bank in response to said gating signal generated by said other control switch means.

5. Control device of claim 1 wherein said control switch means is a windshield wiper control switch.

6. In a vehicle having multiple control stations for electrically controlling vehicle accessories, a control device for switching control of said accessories between said stations comprising:

an output connector connected to said accessories;

an input control located at each of said stations, each of said input controls including a windshield washer switch for initiating a windshield washing function; and gating means responsive to said windshield washer switch for switching from a first condition connecting one of said stations to said output connector to a second condition disconnecting said one station and connecting another said station to said output connector.

7. Control device of claim 6 wherein each of said input controls includes a plurality of switch means for controlling said vehicle accessories.

8. Control device of claim 7 wherein said gating means includes switch banks, each of said switch banks connected between a respective said input control and said output connector, and an enabling means connected to said windshield washer switches for enabling one of said switch banks in response to one of said windshield washer switches thereby connecting said plurality of switch means corresponding to one said input control to said output connector, and enabling another of said switch banks in response to another of said windshield washer switches thereby disabling said one input control and connecting said plurality of switch means corresponding to another said input control to said output connector.

9. Control device of claim 8 wherein said enabling means includes logic having one input connected to one windshield wiper switch, another input connected to another windshield wiper switch, one output connected to one switch bank, and another output connected to another switch bank, said logic enabling said one switch bank in response to actuation of said one windshield wiper switch to the exclusion of said other switch bank and enabling said other switch bank in response to said other windshield wiper switch to the exclusion of said one switch bank.

10. Control device of claim 6 further comprising delay means for inhibiting initiation of said windshield washer function until said windshield washing switch is activated for a predetermined time period.

* * * * *